United States Patent
Won et al.

(10) Patent No.: US 12,368,464 B2
(45) Date of Patent: Jul. 22, 2025

(54) ELECTRONIC DEVICE INCLUDING GRIP SENSOR AND ANTENNA

(71) Applicant: SAMSUNG ELECTRONICS CO., LTD., Suwon-si (KR)

(72) Inventors: Seungjae Won, Suwon-si (KR); Junghwan Kim, Suwon-si (KR); Junghoon In, Suwon-si (KR); Hoseop Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 196 days.

(21) Appl. No.: 18/095,843

(22) Filed: Jan. 11, 2023

(65) Prior Publication Data
US 2023/0254002 A1    Aug. 10, 2023

Related U.S. Application Data

(63) Continuation of application No. PCT/KR2022/020346, filed on Dec. 14, 2022.

(30) Foreign Application Priority Data

Feb. 8, 2022 (KR) .................. 10-2022-0016522

(51) Int. Cl.
H01Q 1/24 (2006.01)
H04B 1/3827 (2015.01)

(52) U.S. Cl.
CPC .......... *H04B 1/3838* (2013.01); *H01Q 1/243* (2013.01); *H04M 2250/12* (2013.01)

(58) Field of Classification Search
CPC .. H04B 1/3838; H04M 2250/12; H01Q 1/243
See application file for complete search history.

(56) References Cited

U.S. PATENT DOCUMENTS

| | | | |
|---|---|---|---|
| 2013/0029625 A1 | 1/2013 | Park et al. | |
| 2014/0171159 A1* | 6/2014 | Endo | H01Q 1/243 343/904 |
| 2014/0327587 A1 | 11/2014 | Won | |
| 2015/0303979 A1 | 10/2015 | Shin et al. | |

(Continued)

FOREIGN PATENT DOCUMENTS

| CN | 111491051 A | 8/2020 |
|---|---|---|
| JP | 2014-121026 A | 6/2014 |

(Continued)

OTHER PUBLICATIONS

International Search Report (PCT/ISA/210) issued by the International Searching Authority on Mar. 21, 2023 in International Application No. PCT/KR2022/020346.

(Continued)

*Primary Examiner* — Jimmy T Vu
(74) *Attorney, Agent, or Firm* — Sughrue Mion, PLLC

(57) ABSTRACT

An electronic device for performing wireless communication includes: a feeding line; a first antenna; a second antenna connected to the first antenna through the feeding line; a grip sensor disposed adjacent to and connected to the first antenna; at least one capacitor configured to match the first antenna and the second antenna; and an inductor electrically connecting the first antenna and the second antenna to each other.

16 Claims, 5 Drawing Sheets

(56) References Cited

U.S. PATENT DOCUMENTS

| | | | |
|---|---|---|---|
| 2017/0047637 A1 | 2/2017 | Kim et al. | |
| 2017/0331175 A1* | 11/2017 | Kwon | ............... H01Q 9/42 |
| 2019/0067801 A1 | 2/2019 | Kang et al. | |
| 2019/0334225 A1 | 10/2019 | Lee et al. | |
| 2020/0194928 A1* | 6/2020 | Yeo | ............... H01Q 1/245 |
| 2021/0250873 A1 | 8/2021 | Liu et al. | |

FOREIGN PATENT DOCUMENTS

| | | |
|---|---|---|
| JP | 2021-129288 A | 9/2021 |
| KR | 10-2014-0130785 A | 11/2014 |
| KR | 10-2015-0121832 A | 10/2015 |
| KR | 10-2017-0019838 A | 2/2017 |
| KR | 10-2017-0128015 A | 11/2017 |
| KR | 10-2018-0013203 A | 2/2018 |
| KR | 10-2019-0023995 A | 3/2019 |
| KR | 10-2020-0073478 A | 6/2020 |
| KR | 10-2022-0007331 A | 1/2022 |
| WO | 2020/162645 A1 | 8/2020 |

OTHER PUBLICATIONS

Written Opinion (PCT/ISA/237) issued by the International Searching Authority on Mar. 21, 2023 in International Application No. PCT/KR2022/020346.

\* cited by examiner

ELECTRONIC DEVICE INCLUDING GRIP SENSOR AND ANTENNA

CROSS-REFERENCE TO RELATED APPLICATIONS

This application is a Bypass Continuation of International Application No. PCT/KR2022/020346 designating the United States, filed on Dec. 14, 2022, in the Korean Intellectual Property Receiving Office and claiming priority to Korean Patent Application No. 10-2022-0016522, filed on Feb. 8, 2022, in the Korean Intellectual Property Office, the disclosures of which are incorporated by reference herein in their entireties.

BACKGROUND

1. Field

The disclosure relates to an electronic device including a grip sensor and an antenna.

2. Description of Related Art

In line with rapid development of mobile communication systems, demands for services that use wireless communication have increased, and electronic devices including wireless communication modules have been widely used accordingly. Electronic devices supporting wireless communication are simplified to efficiently use systems, and antennas are also required to be simplified while satisfying high-gain characteristics.

Wireless communication devices generate electromagnetic waves, and transmission power of antennas may be increased to improve transmission performance of antennas. The degree to which electromagnetic waves generated as described above are absorbed by human bodies is referred to as specific absorption rate (SAR). Wireless communication devices have limited on-spec transmission power due to the SAR in some cases.

When a wireless communication device includes a grip sensor, the transmission power of signals transmitted by the wireless communication device is maintained at an appropriate level that satisfies the SAR if the grip sensor recognizes an approaching human body. The SAR is measured at a distance specified by the corresponding specification with regard to each communication device type, and if the recognition distance of the grip sensor exceeds the distance measured according to the corresponding specification, the electronic device may output electromagnetic waves with maximum transmission power at the recognition distance.

SUMMARY

The larger distance between an electronic device according to the disclosure and a human body, the less electromagnetic waves absorbed by the human body. Accordingly, if the recognition distance of the grip sensor increases, radiation performance may be improved by increasing the maximum transmission power. When transmission power is maintained, the margin of the SAR value may be additionally secured.

According to an embodiment of the disclosure, when a new frequency band such as WiFi 6E (6 GBz band) is applied, a separate antenna extension pattern (slit sharing hybrid antenna (SSHA)) is used in some cases to secure additional radiation performance. In this case, the recognition distance needs to be extended to an extension pattern added by an existing sensing pad.

A segmented antenna (for example, metal antenna) of a metal edge is exposed to the outside of the terminal, thereby making it difficult to improve performance by using an antenna length change from the design point of view.

According to an embodiment of the disclosure, an electronic device for applying an extended antenna pattern to a grip sensor, based on a separate antenna, may be provided.

According to an aspect of the disclosure, an electronic device for performing wireless communication includes: a feeding line; a first antenna; a second antenna connected to the first antenna through the feeding line; a grip sensor disposed adjacent to and connected to the first antenna; at least one capacitor configured to match the first antenna and the second antenna; and an inductor electrically connecting the first antenna and the second antenna to each other.

The inductor may be configured to short-circuit the first antenna and the second antenna with regard to direct current (DC).

The at least one capacitor may not disposed between the inductor and the first antenna or between the inductor and the second antenna.

The electronic device may further include an antenna matching circuit including the at least one capacitor, and the inductor may be connected in parallel with the antenna matching circuit.

The electronic device may further include including a printed circuit board, wherein the printed circuit board can include: a first surface on which the second antenna is disposed; and a second surface on which the first antenna and the inductor are disposed.

At least one of the grip sensor, the at least one capacitor, and the inductor may be disposed on the printed circuit board and may be connected to the feeding line.

The grip sensor may be configured to sense at least one of a radiation pattern by the first antenna and a radiation pattern by the second antenna.

The grip sensor may further include a sensing pad electrically connected to the feeding line.

The grip sensor may be configured to sense a user approaching the electronic device, based on an amount of a change in a capacitance of the sensing pad.

The grip sensor may be further configured to sense at least one of a radiation pattern by the first antenna and a radiation pattern by the second antenna through the sensing pad.

According to an aspect of the disclosure, an electronic device includes: a housing; a printed circuit board disposed inside the housing; an antenna matching circuit disposed on the printed circuit board and including at least one capacitor; a feeding line; a first antenna connected to the antenna matching circuit through the feeding line; a second antenna connected to the antenna matching circuit through the feeding line; and an inductor electrically connecting the first antenna and the second antenna to each other.

The inductor may be configured to short-circuit the first antenna and the second antenna with regard to direct current (DC).

The at least one capacitor may be not disposed between the inductor and the first antenna or between the inductor and the second antenna.

The inductor may be connected in parallel with the antenna matching circuit.

The printed circuit board may include a first surface on which the second antenna may be disposed, and a second surface on which the first antenna and the inductor are disposed.

The electronic device may further include a grip sensor disposed on the printed circuit board and adjacent to the first antenna, and the grip sensor, the at least one capacitor, and the inductor may be connected to the feeding line.

The grip sensor may include a sensing pad configured to sense at least one of a radiation pattern by the first antenna and a radiation pattern by the second antenna.

The grip sensor may be configured to sense a user approaching the electronic device, based on an amount of a change in a capacitance of the sensing pad.

According to various embodiments, the sensing range of a grip sensor may be extended according to extension and change of an antenna pattern in an electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
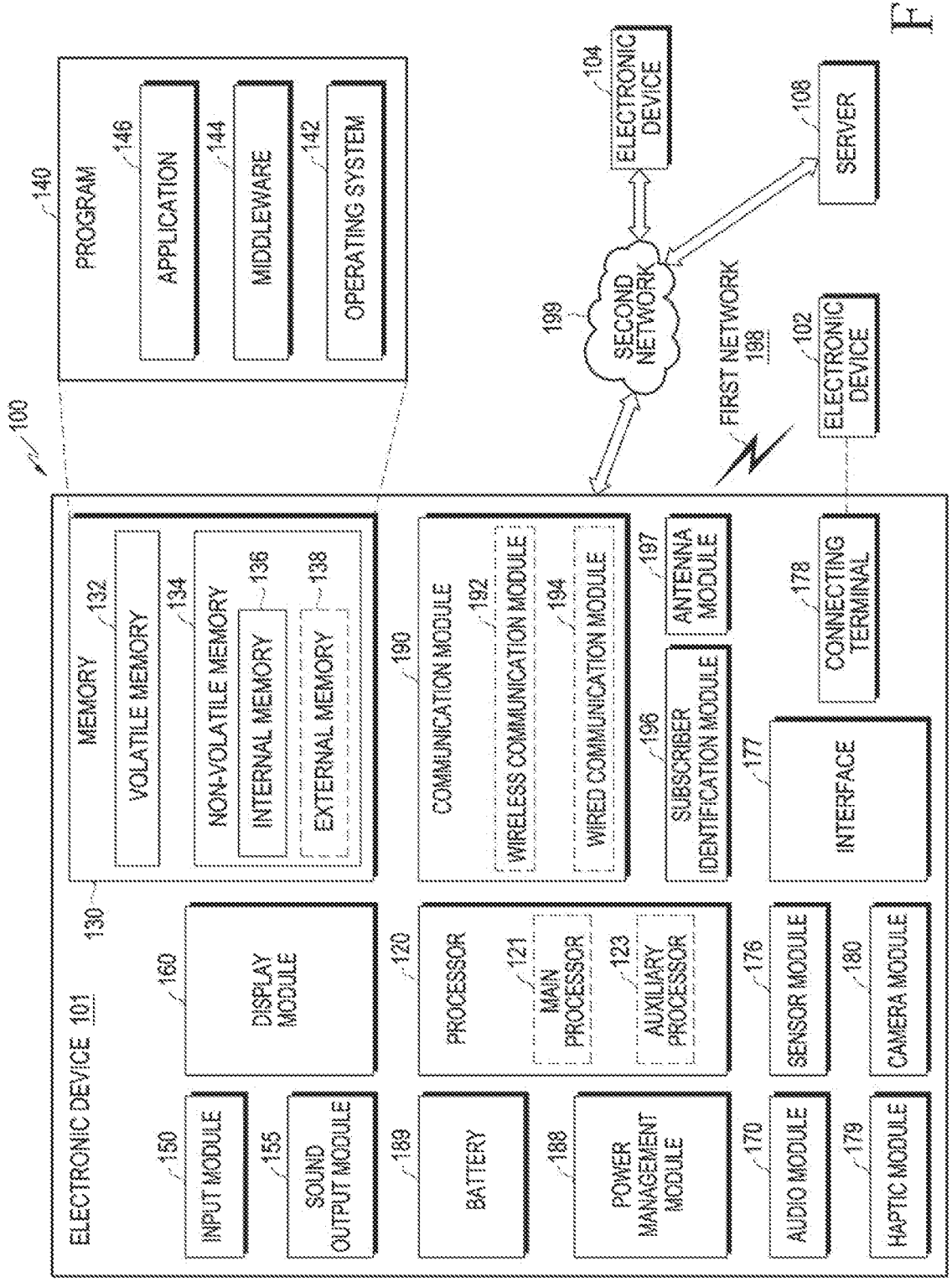
FIG. 1 is a block diagram illustrating an electronic device in a network environment according to various embodiments.

The drawings included herein and the various embodiments used to explain the principles of the disclosure are for illustrative purposes only and should not be construed as limiting the scope of the disclosure. Moreover, those skilled in the art will understand that the principles of the disclosure may be implemented in any suitably arranged wireless communication system.

Before undertaking the detailed description below, it may be advantageous to set forth definitions of certain words and phrases used throughout this patent document. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

3GPP TS 36.213 section 5.1.2 "Physical Uplink Control Channel" is incorporated by reference in this disclosure. The term "antenna-related elements" means a collection of components that may include an RF chain, a PF path (a mixer, a power amplifier, a phase shifter, etc.), a panel, physical antenna elements, and the like.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Figure 2A:
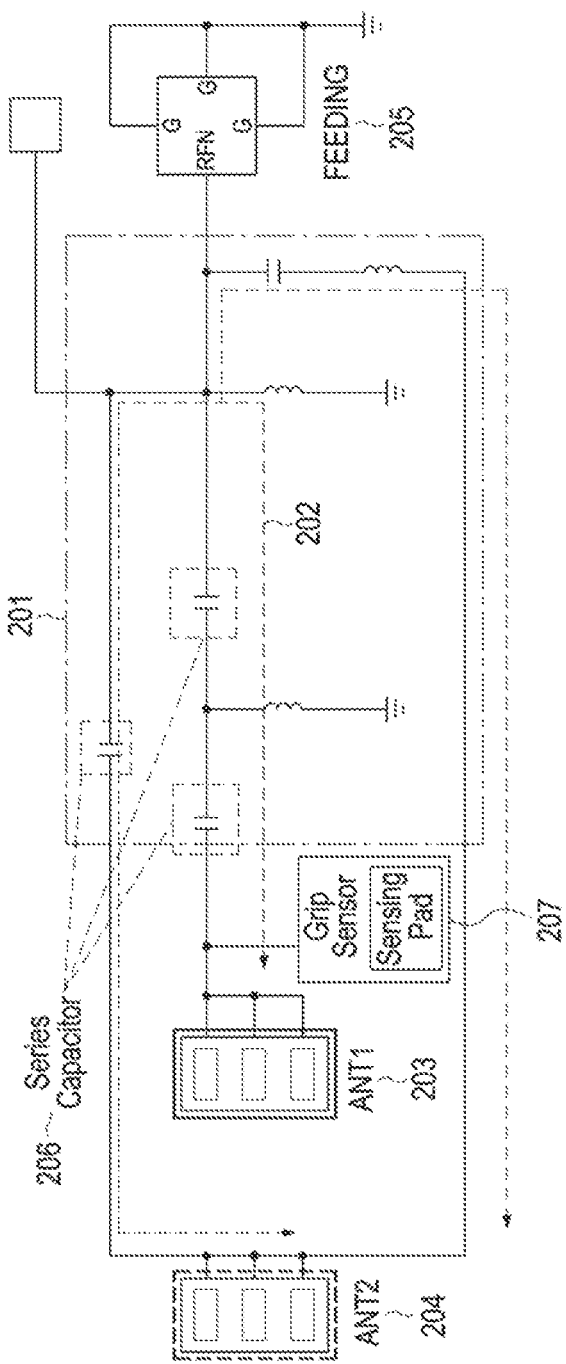
FIG. 2A is a block diagram illustrating a circuit diagram included in an electronic device according to various embodiments.

Referring to FIG. 2A, a circuit diagram for antenna matching is shown. Antenna matching is an example of a circuit structure necessary to ensure the performance of an antenna, and may adjust the impedance of a radio frequency (RF) connection circuit 202.

Referring to FIG. 2A, the first antenna 203 may be an antenna element including a metal material. For example, the first antenna 203 may be a segment shape of a metal edge.

Figure 2B:
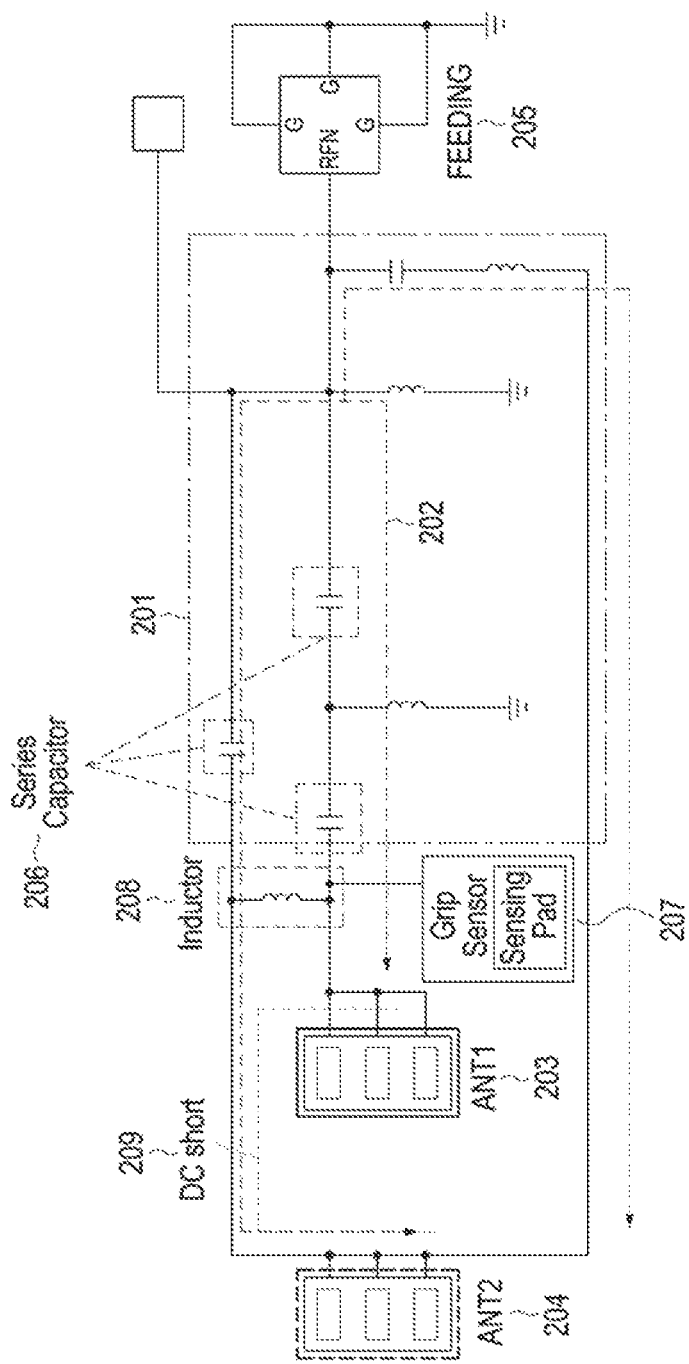
FIG. 2B illustrates a circuit diagram included in an electronic device according to an embodiment of the disclosure.

Referring to FIG. 2B, the existing first antenna 203 may form an outer appearance of the electronic device (e.g., a terminal), and a second antenna 204, which is a separate antenna, may be additionally provided to improve the performance of the antenna, rather than changing the length of the first antenna 203. For example, to additionally secure a new frequency band, which is not supported by the first antenna 203, a slit sharing hybrid antenna (SSHA) may be additionally provided as a separate antenna. For example, by applying the pattern of the added antenna to a separate carrier, the second antenna 204 may be formed, for example, may be formed on the flexible printed circuit board (FPCB). For example, in a terminal for performing wireless communication, the second antenna 204 may share a single first feeding line 205 with the first antenna 203. In addition, the first antenna 203 and the second antenna 204 may be RF-connected 202 to each other through one or more capacitors 206 for antenna matching. Furthermore, to improve the radiation performance of the first antenna 203, the antenna radiation pattern may be extended and modified by the separate second antenna 204 sharing the same first feeding line 205 and antenna matching circuit 201.

Referring to FIG. 2A, an antenna matching circuit 201 may include at least one capacitor 206. It can be considered that direct current (DC) connection between the first antenna 203 and the second antenna 204 is cut off by the at least one capacitor 206.

Referring to FIG. 2A, a grip sensor 207 may be connected to a location adjacent to the first antenna 203. For example, the grip sensor 207 may recognize an approach of a human body by an amount of change in capacitance of a sensing pad connected to the sensor, and for the operation of the grip sensor 207, the sensing pad may require IC and DC connections for sensing processing. However, the grip sensor 207 may sense the radiation pattern of the first antenna 203 by using a sensing pad due to the adjacent connection with the first antenna 203 in order to satisfy the SAR standard, but the grip sensor 207 cannot sense the radiation pattern of the second antenna 204 since DC connection of the second antenna 204 with the grip sensor 207 is cut off by the at least one capacitor 206. For example, due to the at least one capacitor 206 positioned between the first antenna 203 and the second antenna 204, the grip sensor 207 connected adjacently to the first antenna 203 may only sense the antenna pattern of the first antenna 203 by using the sensing pad, and may not sense the antenna pattern formed by the second antenna 204 because the DC connection thereof with the grip sensor is cut off.

Referring to FIG. 2B, an inductor 208 may connect the first antenna 203 and the second antenna 204 to each other while being interposed therebetween. For example, the inductor 208 may have a DC short 209 and RF open characteristics. By using these characteristics, the first antenna 203 and the second antenna 204 may be connected to each other by the inductor 208 before passing through at least one capacitor 206 of the antenna matching circuit 201. In other words, by the inductor 208, the first antenna 203 and the second antenna 204 may be short-circuited 209 in terms of DC and be opened in terms of RF. Particularly, in case that the first antenna 203 and the second antenna 204 are connected at the shortest distance by using the inductor 208, the extended pattern of the SSHA may be sensed by the grip sensor 207 without affecting the radiation performance, by using the DC short 209 and RF open characteristics of the inductor 208.

Referring to FIG. 2B, the inductor 208 may be connected in parallel with the antenna matching circuit 201.

According to various embodiments of the disclosure, in the case that the second antenna 204 is added, the inductor 208 may be added before passing through the antenna matching circuit 201 so that the first antenna 203 and the second antenna 204 may be short circuited 209 in terms of DC and be opened in terms of RF.

Various embodiments of the disclosure provide an electronic device including an antenna device and structure in which a sensing pad of the grip sensor 207 connected adjacently to the first antenna 203 can be utilized with respect to an antenna radiation pattern extended by at least one second antenna 204.

Various embodiments of the disclosure may include a structure in which the first antenna 203 and the second antenna 204 are connected by the inductor 208 that is located next to (e.g., in parallel with) the antenna matching circuit 201 of the first antenna and the second antenna 204, and thus may utilize a sensing pad of the grip sensor 207 connected adjacently to the first antenna 203.

Various embodiments of the disclosure, in a case that an extension pattern of the second antenna 204, having the same first feeding line 205 with the first antenna 203, is used to secure the performance of the first antenna 203 when using the grip sensor 207 capable of recognizing the proximity of the human body to satisfy the SAR standard of the electronic device 101, the sensing range of the grip sensor 207 can be improved by utilizing the extension pattern of the second antenna 204, which is electrically connected with the first antenna 203 via the inductor 208.

According to various embodiments of the disclosure, the sensing pad of the existing grip sensor 207 can perform sensing even if the antenna radiation pattern is extended and deformed by the addition of the antenna (e.g., the second antenna 204). In addition, in the case that the electromagnetic wave absorbed into the human body is lowered due to the extension of the recognition distance of the sensing pad, the radiation performance can be improved by increasing transmission power or the SAR margin can be further secured.

Figure 3:
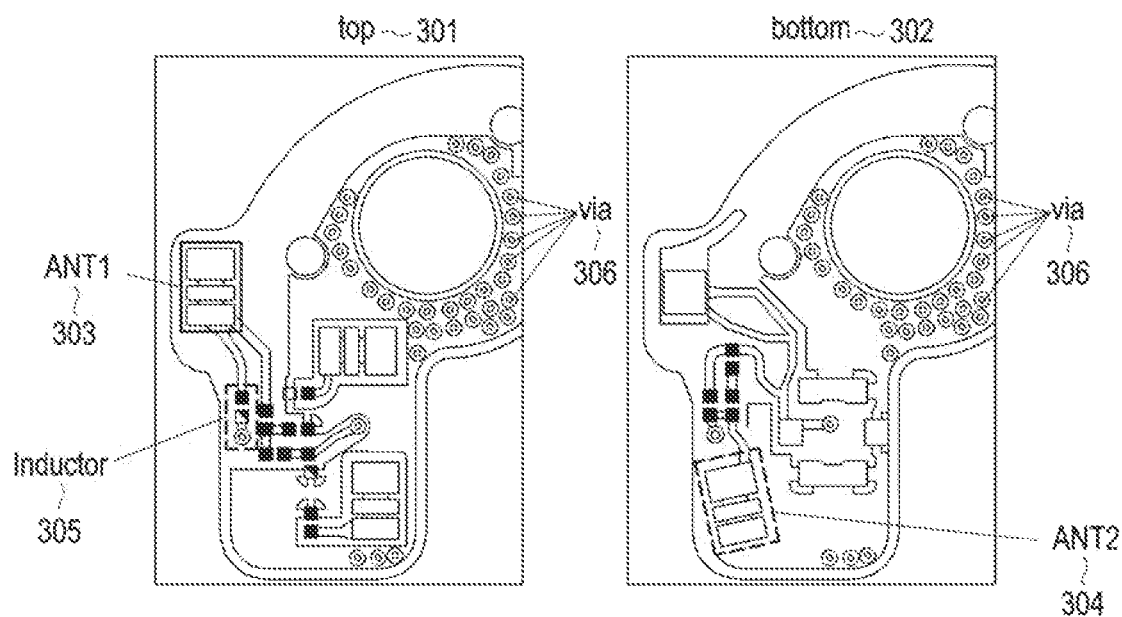
FIG. 3 illustrates an arrangement of each component included in a part of an electronic device of the disclosure.

FIG. 3 illustrates an example of arrangement of components included in a part of an electronic device (e.g., electronic device 101 in FIG. 1) according to various embodiments of the disclosure.

According to various embodiments of the disclosure, the description of FIGS. 2A and 2B may be applied mutatis mutandis to a first antenna (e.g., first antenna 203 in FIG. 2A and 303 in FIG. 3), a second antenna (e.g., second antenna 204 in FIG. 2A and second antenna 304 in FIG. 3), and an inductor (e.g., inductor 208 in FIG. 2B and inductor 305 in FIG. 3).

Referring to FIG. 3, the electronic device may include a printed circuit board, and at least a part of the PCB may be disposed at the outer edge or at a corner of the electronic device. For example, the first antenna 303 and the inductor 305 may be illustrated as being positioned on a second surface 301 corresponding to the top of the PCB, and the second antenna 304 may be illustrated as being positioned on a first surface 302 corresponding to the bottom of the PCB. Alternatively or in addition, at least one of the first antenna 303, the second antenna 304, and the inductor 305 may be positioned on the same surface of the PCB. The description of FIGS. 2A and 2B may be applied mutatis mutandis to the connection relationship between the first antenna 303, the second antenna 304, and the inductor 305.

Referring to FIG. 3, the first surface 302 and the second surface 301 may be connected through one or more vias 306.

Figure 4:
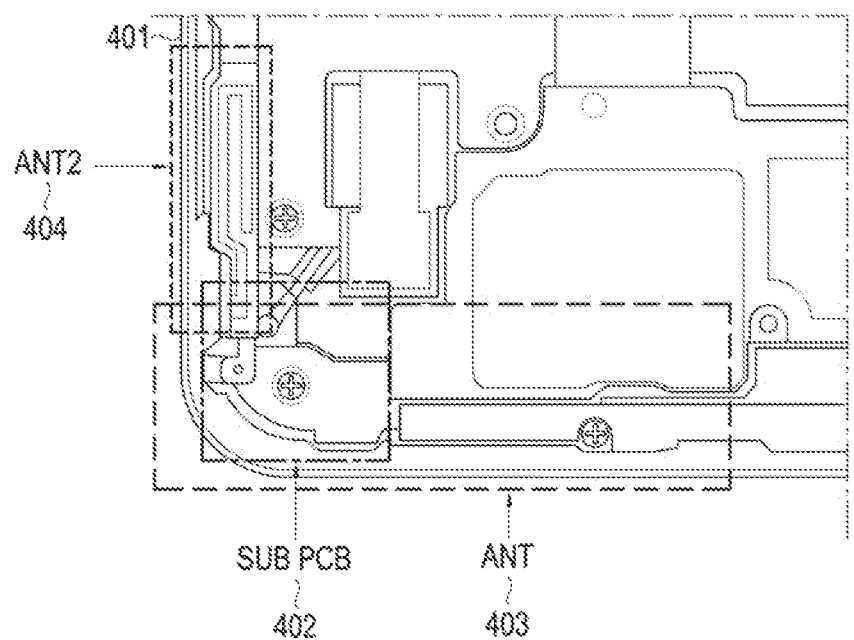
FIG. 4 illustrates an example of an electronic device to which a circuit diagram according to various embodiments of the disclosure is applied.

FIG. 4 illustrates an example of an electronic device to which a circuit diagram according to various embodiments of the disclosure is applied.

Referring to FIG. 4, an electronic device (e.g., electronic device 101 in FIG. 1 and electronic device 401 in FIG. 4), a first antenna (e.g., first antenna 203 in FIG. 2A and first antenna 403 in FIG. 4), a second antenna (e.g., second antenna 204 in FIG. 2A and second antenna 404 in FIG. 4), and the remaining components including the antenna matching circuit 201 may be included in a printed circuit board (e.g., the sub-PCB 402 in FIG. 4). The descriptions of FIGS. 1 to 2B may be applied mutatis mutandis to the respective components and the connection relationship between the components.

According to various embodiments of the disclosure, in the case that the second antenna 204, which is a separate extension antenna configured to share the same feeding and antenna matching with the first antenna 203, is added to improve the radiation performance of the first antenna 203, and the grip sensor 207 for satisfying the SAR standards is connected to the first antenna 203, the first antenna 203 and the second antenna 204 may be connected by the inductor 208 before passing through at least one capacitor 206 of the antenna matching circuit 201 to extend the sensing pad of the grip sensor 207 without affecting the radiation performance, thereby improving the recognition distance. In other words, by connecting the second antenna 204 to the first antenna 203 electrically via the inductor 208, the radiation pattern for the sensing pad of the grip sensor 207 is extended. As a result, the recognition distance of the sensing pad is extended accordingly. Thus, the radiation performance can be improved by increasing the maximum transmission power, and in case that the maximum transmission power is maintained, the SAR margin can be further secured. Table 1 shows numerical values through comparison before and after the inductor 208 is included in the circuit diagram of the disclosure.

TABLE 1

| Inductor (eg., SM-X706B) | 2.4G 11b Total Radiation Power (TRP) | | | 5G 11a TRP | | | | 11ax 6E TRP | | | Grip Sensor Recognition distance | | |
|---|---|---|---|---|---|---|---|---|---|---|---|---|---|
| | 1 | 6 | 11 | 44 | 100 | 140 | 161 | 5 | 113 | 225 | FRONT | SIDE | BACK |
| Before applying Inductor | 13.85 | 14.92 | 13.95 | 10.5 | 11.55 | 11.76 | 9.15 | 5.26 | 5.37 | 3.59 | 8 | 3 | 11 |
| After applying Inductor | 14.22 | 14.77 | 14.32 | 10.38 | 11.45 | 11.84 | 9.73 | 5.48 | 5.34 | 3.47 | 12 | 7 | 13 |
| DELTA | 0.37 | −0.15 | 0.37 | −0.12 | −0.1 | 0.08 | 0.58 | 0.22 | −0.03 | −0.12 | 4 | 4 | 2 |

As noted from Table 1, the change in power consumption before and after the inductor 208 is placed between the first antenna 203 and the second antenna 204 is not large, but the recognition distance is generally increased after the inductor 208 is applied.

What is claimed is:

1. An electronic device for performing wireless communication, the electronic device comprising:
   a feeding line comprising one common ground;
   a first antenna connected to the feeding line;
   a second antenna connected to the feeding line shared with the first antenna;
   a grip sensor disposed adjacent to and connected to the first antenna;
   at least one capacitor configured to match the first antenna and the second antenna; and
   an inductor electrically connecting the first antenna and the second antenna to each other,
   wherein the inductor is configured to short-circuit the first antenna and the second antenna with regard to direct current (DC) and be open with respect to radio frequency (RF).

2. The electronic device of claim 1, wherein the at least one capacitor is not disposed between the inductor and the first antenna or between the inductor and the second antenna.

3. The electronic device of claim 2, further comprising an antenna matching circuit comprising the at least one capacitor,
   wherein the inductor is connected in parallel with the antenna matching circuit.

4. The electronic device of claim 1, further comprising a printed circuit board,
   wherein the printed circuit board comprises:
   a first surface on which the second antenna is disposed; and
   a second surface on which the first antenna and the inductor are disposed.

5. The electronic device of claim 4, wherein at least one of the grip sensor, the at least one capacitor, and the inductor is disposed on the printed circuit board and is connected to the feeding line.

6. The electronic device of claim 1, wherein the grip sensor is configured to sense at least one of a radiation pattern by the first antenna and a radiation pattern by the second antenna.

7. The electronic device of claim 1, wherein the grip sensor further comprises a sensing pad electrically connected to the feeding line.

8. The electronic device of claim 7, wherein the grip sensor is configured to sense a user approaching the electronic device, based on an amount of a change in a capacitance of the sensing pad.

9. The electronic device of claim 7, wherein the grip sensor is further configured to sense at least one of a radiation pattern by the first antenna and a radiation pattern by the second antenna through the sensing pad.

10. An electronic device comprising:
    a housing;
    a printed circuit board disposed inside the housing;
    an antenna matching circuit disposed on the printed circuit board and comprising at least one capacitor;
    a feeding line comprising only one common ground;
    a first antenna connected to the antenna matching circuit and to the feeding line;
    a second antenna connected to the antenna matching circuit and to the feeding line that is shared with the first antenna; and
    an inductor electrically connecting the first antenna and the second antenna to each other,
    wherein the inductor is configured to short-circuit the first antenna and the second antenna with regard to direct current (DC) and be open with respect to radio frequency (RF).

11. The electronic device of claim 10, wherein the at least one capacitor is not disposed between the inductor and the first antenna or between the inductor and the second antenna.

12. The electronic device of claim 11, wherein the inductor is connected in parallel with the antenna matching circuit.

13. The electronic device of claim 10, wherein the printed circuit board comprises a first surface on which the second antenna is disposed, and a second surface on which the first antenna and the inductor are disposed.

14. The electronic device of claim 10, further comprising a grip sensor disposed on the printed circuit board and adjacent to the first antenna,
   wherein the grip sensor, the at least one capacitor, and the inductor are connected to the feeding line.

15. The electronic device of claim 14, wherein the grip sensor comprises a sensing pad configured to sense at least one of a radiation pattern by the first antenna and a radiation pattern by the second antenna.

16. The electronic device of claim 15, wherein the grip sensor is configured to sense a user approaching the electronic device, based on an amount of a change in a capacitance of the sensing pad.

* * * * *